(12) United States Patent
Sato

(10) Patent No.: US 7,542,361 B2
(45) Date of Patent: Jun. 2, 2009

(54) SEMICONDUCTOR INTEGRATED CIRCUIT DEVICE

(75) Inventor: Jumpei Sato, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 226 days.

(21) Appl. No.: 11/457,905

(22) Filed: Jul. 17, 2006

(65) Prior Publication Data

US 2007/0040599 A1 Feb. 22, 2007

(30) Foreign Application Priority Data

Aug. 19, 2005 (JP) ............................. 2005-238230
May 30, 2006 (JP) ............................. 2006-149387

(51) Int. Cl.
*G11C 7/00* (2006.01)
(52) U.S. Cl. .............. 365/205; 365/189.05; 365/189.08
(58) Field of Classification Search ................. 365/205, 365/189.05, 189.08
See application file for complete search history.

(56) References Cited

U.S. PATENT DOCUMENTS 5,847,584 A * 12/1998 Pascucci ...................... 327/68
6,512,715 B2    1/2003 Okamoto et al.
6,650,833 B1 * 11/2003 Oda et al. ...................... 396/89
6,978,434 B1 * 12/2005 Shigyo et al. ................. 716/13

FOREIGN PATENT DOCUMENTS

JP    2002-373490    12/2002
JP    2003-297091    10/2003

* cited by examiner

*Primary Examiner*—Son Dinh
*Assistant Examiner*—Nam Nguyen
(74) *Attorney, Agent, or Firm*—Oblon, Spivak, McClelland, Maier & Neustadt, P.C.

(57) ABSTRACT

A semiconductor integrated circuit device includes: a boost circuit configured to boost power supply voltage so as to generate a boosted voltage; a voltage detecting circuit configured to detect the boosted voltage of the boost circuit and control ON/OFF of the boost circuit for keeping the boosted voltage at a certain level; and a gate circuit configured to set the voltage detecting circuit to be in such an inactive state that current passage thereof is shut off, thereby stopping the operation of the boost circuit while a load is separated from an output node of the boost circuit.

20 Claims, 19 Drawing Sheets

| Boost Circuit | Voltage | Operation |
|---|---|---|
| Vpgm | 16~30V | Only Write Time |
| Vm | 8~14V | Only Write Time |
| Vread | 4~6V | Only Verify Time |
| Vvfy | 0~4V | Only Verify Time |
| Vsg | 3.5V | All Times |

SEMICONDUCTOR INTEGRATED CIRCUIT DEVICE

CROSS-REFERENCE TO RELATED APPLICATION

This application is based on and claims the benefit of priority from the prior Japanese Patent Applications No. 2005-238230, filed on Aug. 19, 2005 and No. 2006-149387, filed on May 30, 2006, the entire contents of which are incorporated herein by reference.

BACKGROUND OF THE INVENTION

1. Field of the Invention

This invention relates to a semiconductor integrated circuit device, specifically relates to a device with a boost circuit for generating an internally boosted voltage in the chip.

2. Description of the Related Art

There have been provided various types of electrically rewritable and non-volatile semiconductor memory devices (EEPROMs), typical one of which is a NAND-type flash memory. In these semiconductor memories, various kinds of internally boosted voltages are generated in the chip, which are necessary for write, erase and read operations.

An internal voltage generating circuit is basically formed of a boost circuit for boosting power supply voltage and a voltage detecting circuit (i.e., voltage limiter) for detecting the output voltage of the boost circuit to control ON/OFF thereof so as to keep the output voltage at a certain level (refer to, for example, Unexamined Japanese Patent Application Publication No. 11-353889). The boost circuit is usually formed of a charge pumping circuit and a clock generator for driving it.

For example, in the NAND type flash memory, one page data write is performed at a time. In this case, to precisely control the threshold distributions of write data, it is used such a write sequence that write voltage applications and write-verify operations are repeatedly performed.

In the above-described write sequence, for example, paying attention to a Vpgm generator in the internal voltage generating circuits, which applies a write voltage Vpgm to a selected word line, a voltage detecting circuit monitors the output voltage of a boost circuit to control ON/OFF thereof, so that the write voltage Vpgm is generated with a necessary level through the write sequence.

However, the write voltage Vpgm is used in practice only during the write voltage applying period, i.e., only when it is supplied to a selected word line as a load. During the verify operation, the Vpgm generator operates intermittently for compensating the through current of the voltage detecting circuit. The voltage detecting circuit is formed to have a resistive voltage divider circuit, in which a consumptive current flows.

The write voltage Vpgm is set at about 20V. To boost an external power supply voltage of 3V or lower to the above-described level, it is required of the charge pumping circuit to contain many boosting stages (i.e., transferring stages), so that power consumption thereof becomes large.

Therefore, it becomes a cause of increasing the power consumption of the memory chip that the voltage detecting circuit continues to carry a current, and the boost circuit continues the intermittent operations. Specifically, in case a large capacitive flash memory is adapted to mobile devices, it becomes an important subject to reduce the power consumption.

SUMMARY OF THE INVENTION

According to an aspect of the present invention, there is provided a semiconductor integrated circuit device including:
a boost circuit configured to boost power supply voltage so as to generate a boosted voltage;
a voltage detecting circuit configured to detect the boosted voltage of the boost circuit and control ON/OFF of the boost circuit for keeping the boosted voltage at a certain level; and
a gate circuit configured to set the voltage detecting circuit to be in such an inactive state that current passage thereof is shut off, thereby stopping the operation of the boost circuit while a load is separated from an output node of the boost circuit.

According to another aspect of the invention, there is provided a semiconductor integrated circuit device including:
a memory cell array with electrically rewritable and non-volatile memory cells arranged therein;
a read/write circuit configured to read data of and write data in the memory cell array; and
an internal voltage generating circuit configured to generate internal voltages supplied to the memory cell array and the read/write circuit in accordance with operation modes, wherein
the internal voltage generating circuit comprises:
a boost circuit configured to boost power supply voltage so as to generate a boosted voltage;
a voltage detecting circuit configured to detect the boosted voltage of the boost circuit and control ON/OFF of the boost circuit for keeping the boosted voltage at a certain level; and
a gate circuit configured to set the voltage detecting circuit to be in such an inactive state that current passage thereof is shut off, thereby stopping the operation of the boost circuit while a load is separated from an output node of the boost circuit.

DETAILED DESCRIPTION OF THE EMBODIMENTS

Illustrative embodiments of this invention will be explained with reference to the accompanying drawings below.

Figure 1:
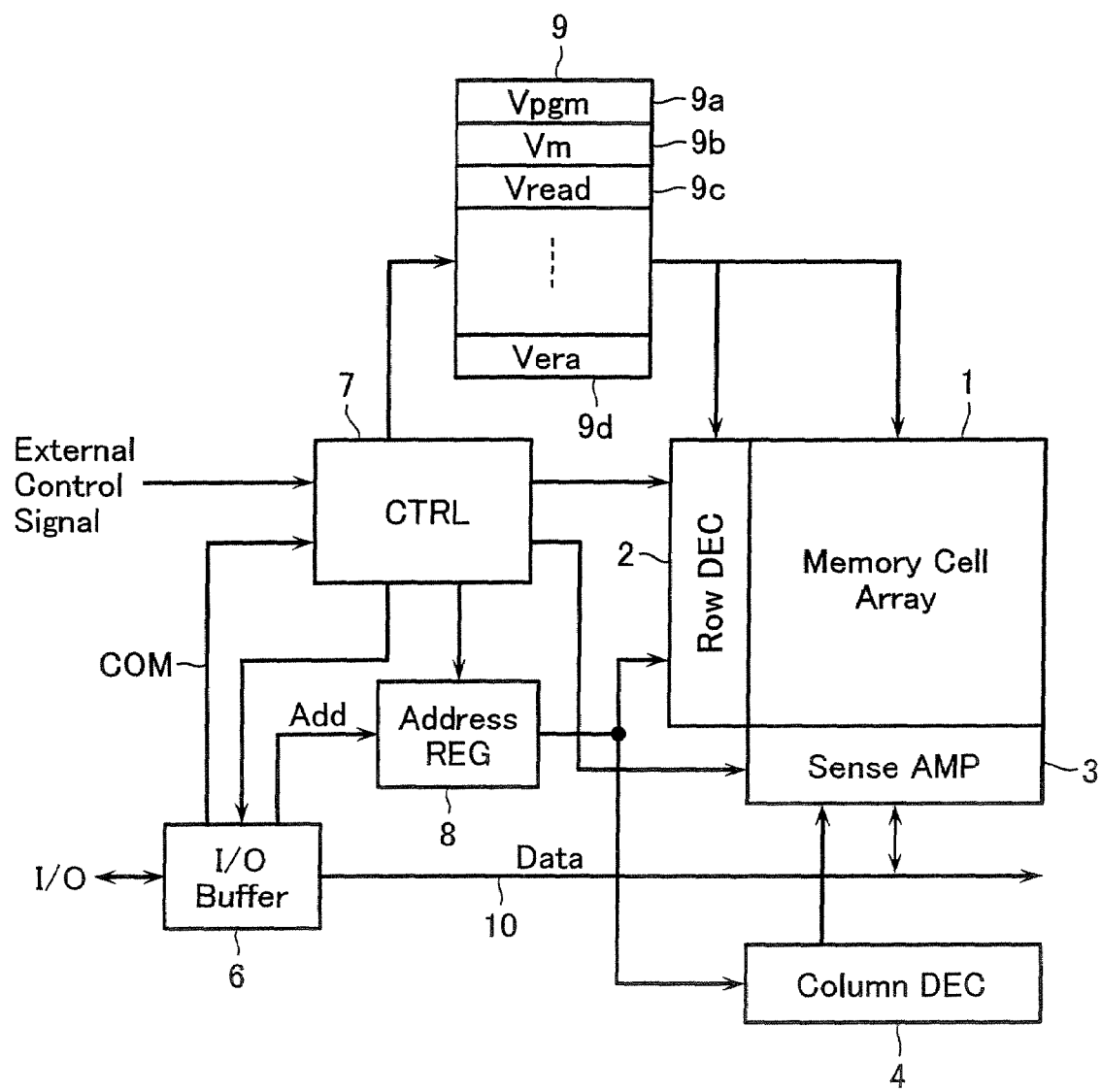
FIG. 1 shows a functional block configuration of a NAND flash memory in accordance with an embodiment of the present invention.
Figure 2:
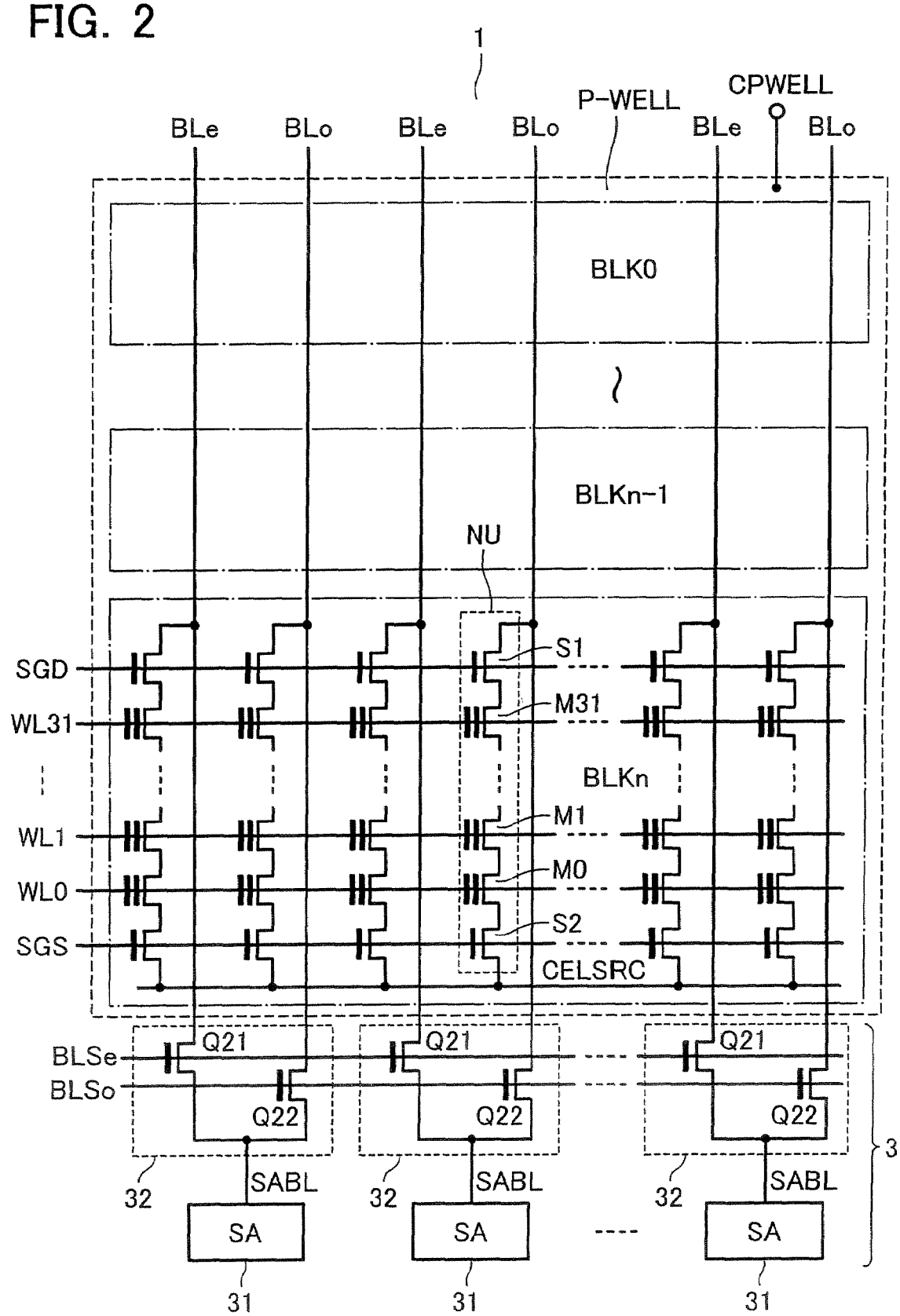
FIG. 2 shows the memory cell array of the flash memory.

FIG. 1 shows a functional block configuration of a NAND-type flash memory in accordance with an embodiment; and FIG. 2 a configuration of the memory cell array 1. The memory cell array 1 is, as shown in FIG. 2, formed of NAND cell units NU arranged therein. The NAND cell unit NU has a plurality of (thirty two in the example) electrically rewritable and non-volatile memory cells M0-M31 connected in series and first and second select gate transistors S1 and S2, which serve for coupling both ends of the cell string to bit line BL and source line CELSRC, respectively.

Control gates of the memory cells in the NAND cell unit are coupled to different word lines WL0-WL31. Gates of the first and second select gate transistors S1 and S2 are coupled to select gate lines SGD and SGS, respectively, which are disposed in parallel with the word lines.

A set of memory cells sharing a word line constitutes a page (or two pages), which serves as a data read unit or data write unit. A set of NAND cell units sharing word lines WL0-WL31 constitutes a block BLKi, which serves as a data erase unit. As shown in FIG. 2, there is prepared plural blocks arranged in the bit line direction to share the bit lines.

As shown in FIG. 1, row decoder 2 is disposed for selectively driving the word lines of the memory cell array 1, and a sense amplifier circuit 3, which serves for reading and writing data, is disposed to be coupled to the bit lines. Row decoder 2 and sense amplifier circuit 3 constitute a read/write circuit, which serves for reading data of and writing data in the memory cell array 1.

The sense amplifier circuit 3 has one page sense units 31. In the example shown in FIG. 2, even numbered bit lines BLe and odd numbered bit lines BLo are selectively coupled to the sense units 31 with bit line select circuits 32.

Command "COM" supplied from external input/output ports I/O is input to a controller 7 via an input/output buffer 6 and decoded to be used for operation controls together with other external control signals. Address "Add" supplied from the input/output ports I/O is transferred to the row decoder 2 and column decoder 4 via address register 8.

Page data read in the sense amplifier circuit 3 is output to the external via data bus 10 and I/O buffer 6 under the control of the column decoder 4.

One page write data supplied from the input/output ports I/O are loaded in the sense amplifier circuit 3 via the I/O buffer 6, and written into the memory cell array 1 in a lump.

To generate various internal voltages necessary in correspondence with operation modes, it is prepared an internal voltage generating circuit 9, which is controlled with the controller 7 to generate internal voltages each boosted from the power supply voltage in accordance with the operation modes.

Some examples being typically shown in FIG. 1, the internal voltage generating circuit 9 includes: Vpgm generator 9a for generating write voltage (Vpgm) applied to a selected word line at a write time; Vm generator 9b for generating channel boost-use write middle voltage (Vm) applied to non-selected word lines at a write time; Vread generator 9c for generating read pass voltage (Vread) applied to non-selected word lines at a read time (including verify-read time); and Vera generator for generating erase voltage (Vera) applied to the p-type well at an erase time. In practice, there are disposed further more internal voltage generators.

In this embodiment, the above-described internal voltage generators are improved to reduce the power consumption. Vpgm generator 9a will be typically explained below.

Figure 3:
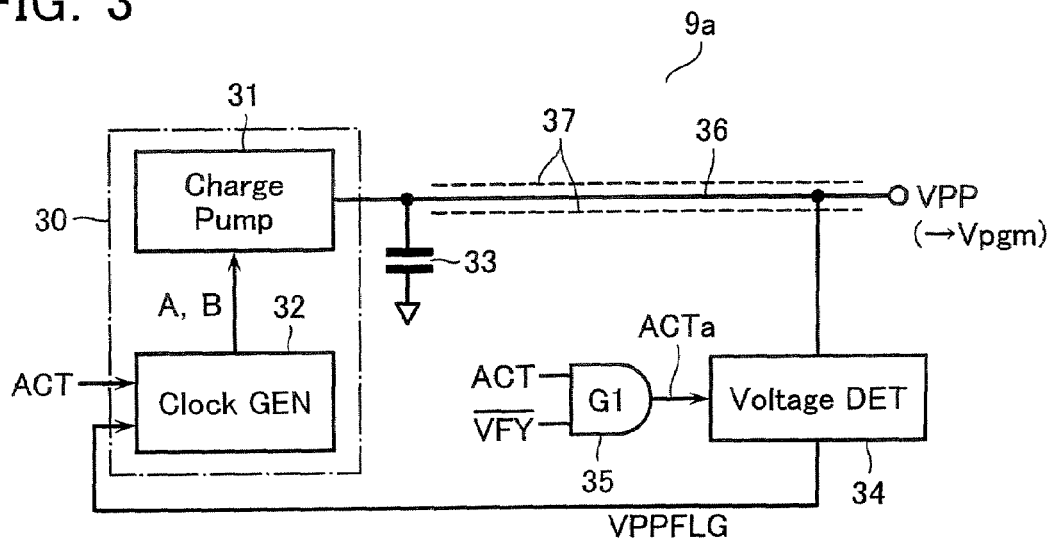
FIG. 3 shows a configuration of a Vpgm generating circuit in the internal voltage generating circuit in the flash memory.

FIG. 3 shows the configuration of the Vpgm generator (or generating circuit) 9a in accordance with this embodiment. Vpgm generator 9a includes a boost circuit 30 and a voltage detecting circuit (i.e., voltage limiter) 34 for monitoring the output voltage of the boost circuit 30 to control ON/OFF thereof.

Figure 5:
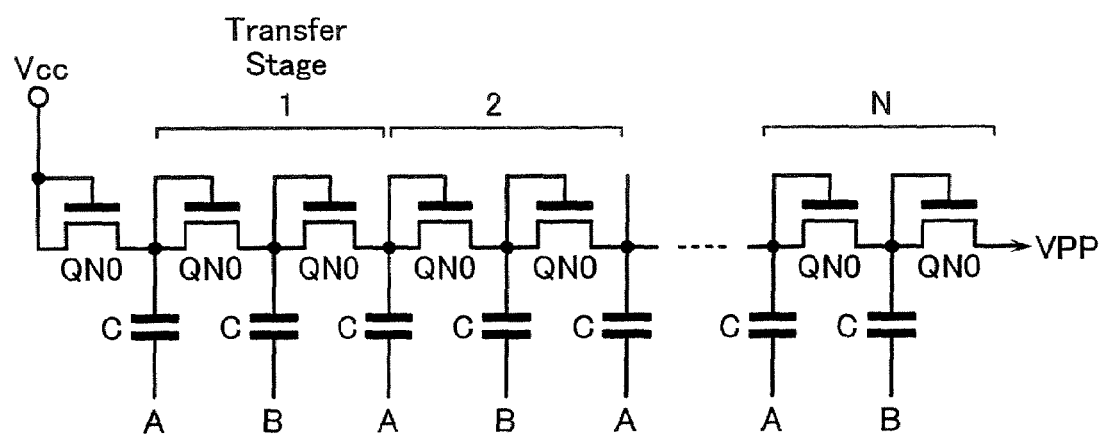
FIG. 5 shows a charge pumping circuit used in the Vpgm generating circuit.

Boost circuit 30 includes a charge pumping circuit 31 and a clock generator circuit 32 for driving it. The charge pumping circuit 31 has, for example, supposing that it is two-phase driving type, as shown in FIG. 5, transferring transistors QN0 connected in series between power supply voltage node Vcc and output node VPP and capacitors C coupled to the respective connection nodes of the transferring transistors QN0. Gate and drain of each transferring transistor QN0 is connected so that the transistor serves as a diode. Capacitors C are alternately driven with complementary clocks A and B.

Figure 6:
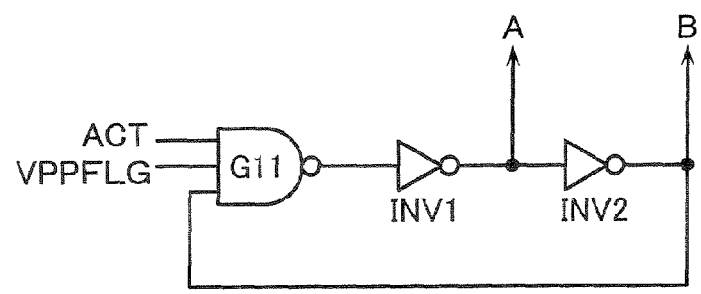
FIG. 6 shows a clock generating circuit used in the Vpgm generating circuit.

The clock generating circuit 32 is, for example as shown in FIG. 6, a ring oscillator, which includes a NAND gate G11 and even stages of inverters INV1 and INV2 connected in a ring-shape.

An activation signal ACT and a detected signal VPPFLG of the voltage detecting circuit 34 are input to the NAND gate G11 together with a feed back signal. Therefore, when ACT=VPPFLG="H", the clock generator generates complementary clocks A and B to drive the charge pumping circuit 31.

A pool capacitor 33 is coupled to the output node of the charge pumping circuit 31 for holding charge. The output line 36 of the charge pumping circuit 31 is coupled in practice to a load (i.e., word line) via a voltage level shift circuit and a driver in the row decoder (these are not shown). In this embodiment, while the boost circuit 30 is not coupled to a word line, the voltage detecting circuit 34 is set in a non-active state that there is no through current, and in response to the output, the boost circuit 30 is also set in a non-active state.

To control the above-described activation/non-activation of the voltage detecting circuit 34, AND gate circuit 35 is prepared. Based on AND logic of the boost activation signal ACT supplied from the controller 7 and a verify signal /VFY, the AND gate circuit 35 generates an activation signal ACTa used for activating the voltage detecting circuit 34.

Figure 4:
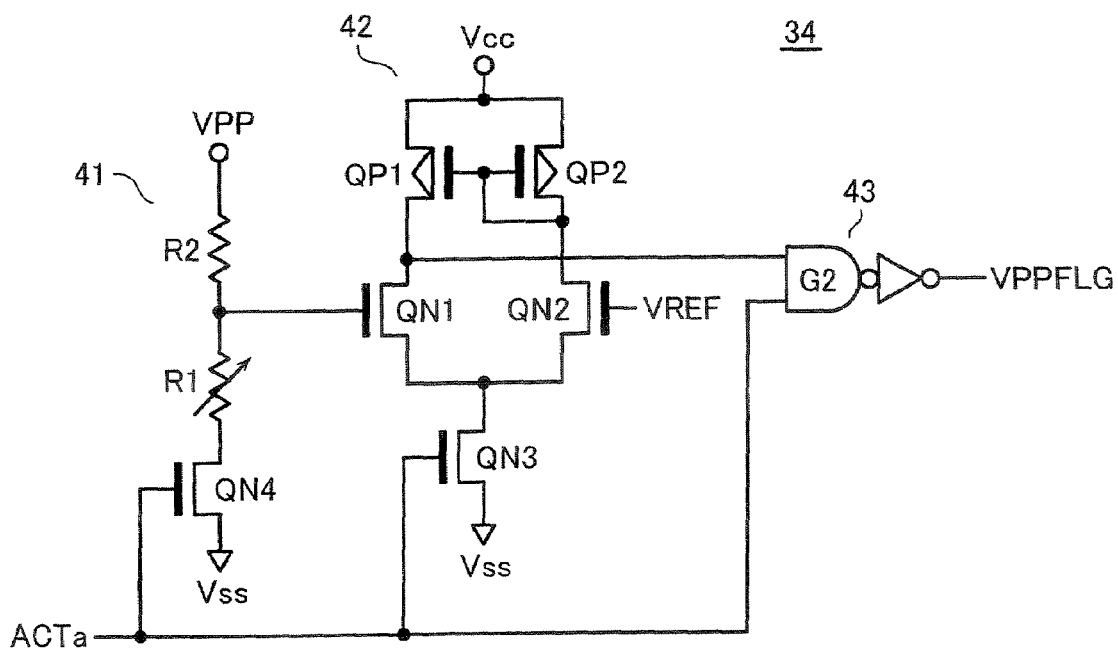
FIG. 4 shows a voltage detecting circuit used in the Vpgm generating circuit.

FIG. 4 shows the configuration of the voltage detection circuit 34, which has a resistive voltage divider circuit 41 for dividing the voltage VPP output from the boost circuit 30 and a differential amplifier 42 for comparing the divided output voltage with a reference voltage VREF to detect the limit voltage for outputting the signal VPPFLG.

The resistive voltage divider circuit 41 has resistors R1 and R2 connected in series between the output node VPP and ground potential node Vss and an activation NMOS transistor QN4 disposed on the current passage. The gate of the activation NMOS transistor QN4 is controlled with the activation signal ACTa.

Figure 7:
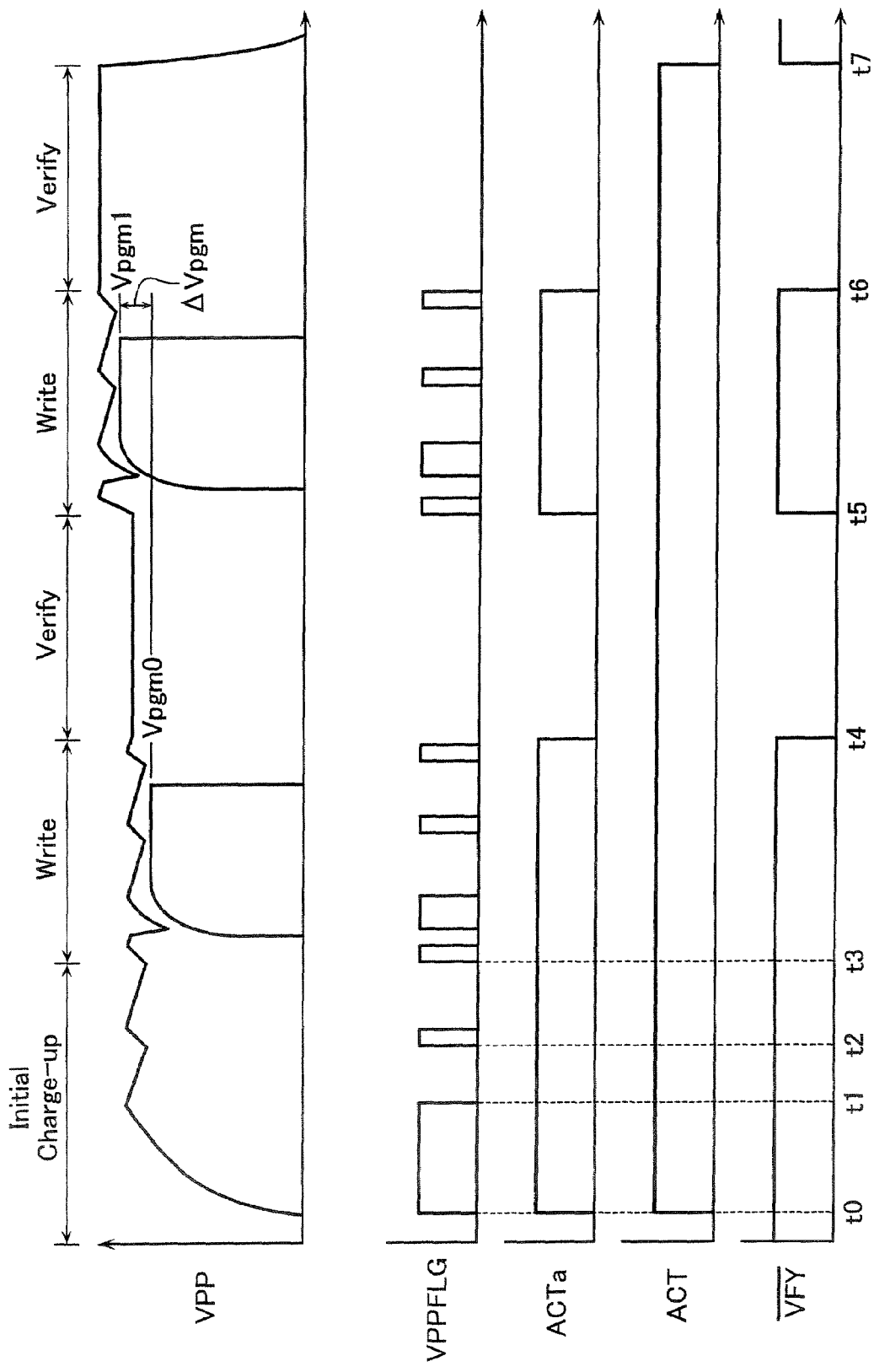
FIG. 7 shows operation waveforms of the Vpgm generating circuit.

One resistor, R1, within the resistors R1 and R2, is variable, and the resistance value changes in accordance with write cycles, so that the limit voltage changes. With this resistance changing, as shown in FIG. 7, write voltage Vpgm is stepped-up by ΔVpgm at every write cycle switching times.

Differential amplifier 42 is of a current mirror type with a PMOS current mirror circuit. NMOS transistors QN1 and QN2 are differential ones. Disposed between the common source and the ground potential node Vss is an activation NMOS transistor QN3, the gate of which is also controlled with the activation signal ACTa.

Note here that a differential amplifier circuit may be formed with an NMOS current mirror circuit. In this case, an activation PMOS transistor will be disposed between the common source of the differential PMOS transistor pair and the power supply node Vcc in place of the activation NMOS transistor QN3.

Disposed at the output node of the differential amplifier 34 is a logic gate 43, which takes AND logic of the output of the differential amplifier 42 and the activation signal ACTa to generate the detection signal VPPFLG for designating that the boosted output voltage has reached a certain level (i.e., limit value).

The operation of the Vpgm generating circuit 9a in accordance with this embodiment will be explained with reference to FIG. 7 below.

The activation signal ACT being made "H" at timing t0, the boost circuit 30 is activated to start the boost operation. The verify signal /VFY is such a signal that it becomes "L" at a verify time. Therefore, at the beginning of the boost operation, /VFY is "H" and the activation signal ACTa is also "H", whereby the detection signal VPPFLG is kept "H".

When the output node VPP of the boost circuit is boosted to reach the limit value, the voltage detection circuit 34 detects it, and VPPFLG becomes "L" (at timing t1). In response to this, the boost circuit 30 stops the boost operation, and the output node VPP will be discharged via the resistive divider circuit 41. When it reaches a level, VPPFLG becomes "H" again, and the boost operation restarts (at timing t2).

The Vpgm generating circuit 9a repeatedly performs the above-described boost operation and stopping thereof, thereby outputting a static output voltage. The write voltage Vpgm is stepped-up as described above.

Data write is performed with write operations (t3-t4, t5-t6, ...) and verify operations (t4-t5, t6-t7, ...) for verifying the write states repeated. The output voltage of Vpgm generating circuit 9a is supplied to a selected word line during each write operation while the selected word line is separated from the circuit 9a during each verify operation.

In this embodiment, during the verify operation, the activation signal ACTa is "L" in response to /VFY="L", so that the voltage detection circuit 34 is made inactive. In other words, the activation transistors QN3 and QN4 shown in FIG. 4 become off, so that current passages in both of the resistive divider circuit 41 and differential amplifier 42 are shut off. Additionally, in this period, the boost circuit 30 also stops the boost operation in response to VPPFLG="L".

According to this embodiment, the consumption current of Vpgm generating circuit 9a may be effectively reduced. In detail, supposing that the charge pumping circuit 31 has, as shown in FIG. 5, N transferring stages, each of which transfers charge amount of ΔQ at a time, the consumption current is expressed as about ΔQ×(N+1)/ε.

Note here that "+1" shows a charge component transferred in the transferring transistor disposed near the power supply node Vcc. ε is a charge transferring efficiency, which is less than 1 in consideration of that consumption currents flow to parasitic loads at the respective nodes. Therefore, the consumption current becomes larger than the amount of the practically transferred charge.

To generate the write voltage Vpgm of 20V to 24V based on the power supply voltage of 3V or lower, the number of the transferring stages, N, becomes large, and the consumption current of the charge pumping circuit becomes large. Therefore, stop the charge pumping circuit operation during verify periods in the write cycles, and the consumption current will be effectively reduced.

As explained above, the output wiring 36 of the boost circuit 30 is separated from the load, and the current passage of the voltage detecting circuit 24 is shut off during the verify operation, so that the output line 36 is made electrically floating with the boosted voltage. In this state, it is desired that noises are not capacitively coupled to the output wiring 36 from other signal lines. Therefore, as schematically shown by a dotted line in FIG. 3, it is desired to use such a wiring layout that the output wiring 36 is sandwiched by shield wirings 37. In detail, power supply wirings and/or ground potential wirings may be used as the shield wirings 37.

Figure 8:
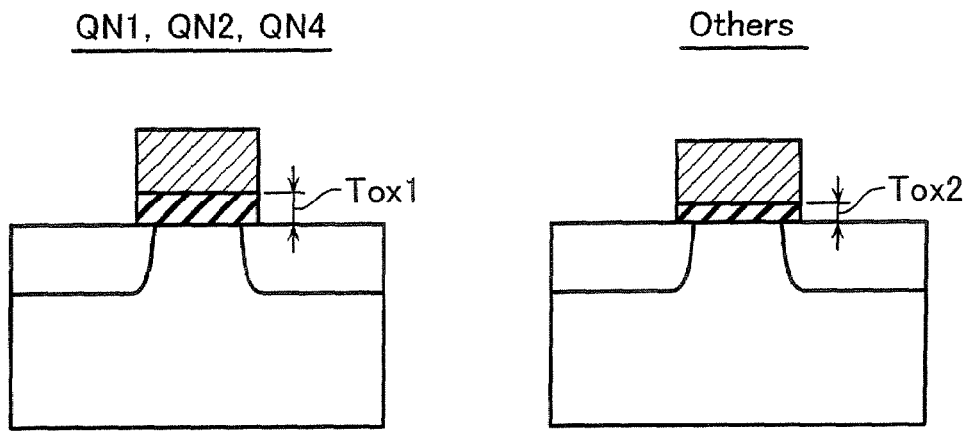
FIG. 8 shows transistor structures used in the Vpgm generating circuit.

In the voltage detecting circuit 34, the boosted high voltage is directly applied to the transistors QN1 and QN4. Therefore, these transistors may be preferably formed of a high breakdown voltage transistor as shown in FIG. 8 with a gate insulating film of Tox1 thick, which is thicker than the gate insulating film thickness Tox2 in other transistors.

Although the high voltage is not directly applied to the transistor QN2 within the transistors QN1 and QN2 serving as the differential transistor pair, it is required of these transistors to be uniformed in characteristic. Therefore, in case the gate oxide film of the transistor QN1 is made thick, the transistor QN2 should be formed with the same gate oxide film thickness as the transistor QN1.

Figure 9:
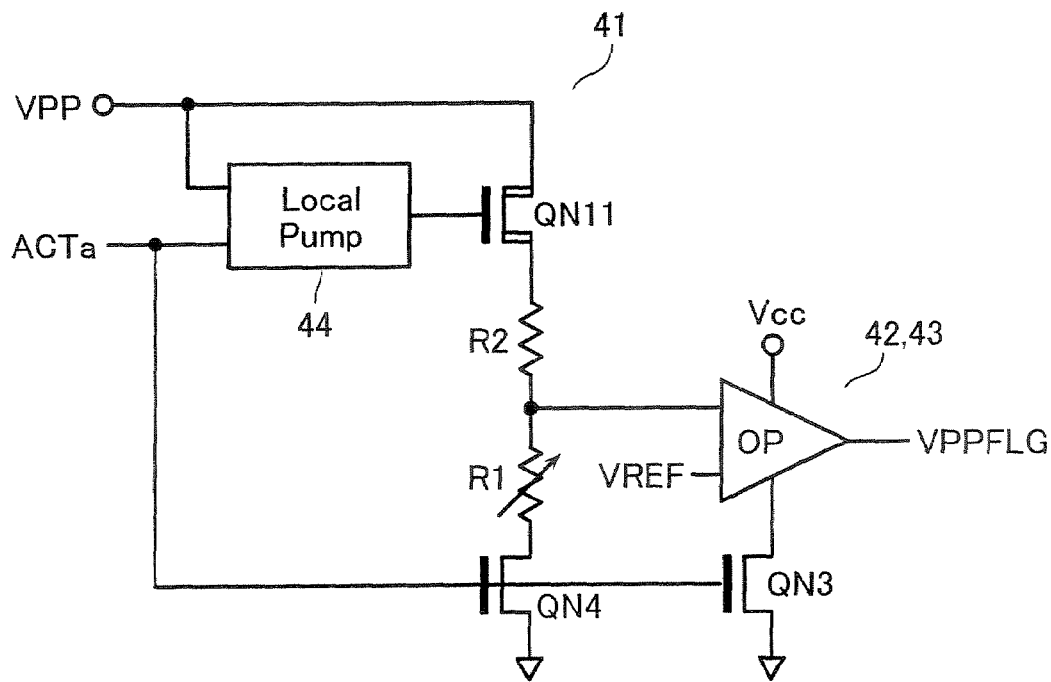
FIG. 9 shows another voltage detecting circuit.

FIG. 9 shows another configuration of the voltage detecting circuit (i.e., voltage limiter) 34. What is different from that shown in FIG. 4 is in that another switching NMOS transistor QN11 is disposed on the VPP node side edge (i.e., on the edge adjacent to the VPP node of the boost circuit) of the current passage in the resistive voltage dividing circuit 41. This transistor QN11 is high breakdown voltage one with a gate oxide film thicker than that of the others as shown in FIG. 8.

If there is a voltage drop corresponding to the threshold voltage Vth between the drain and the source of the switching transistor QN11 when it is on, it becomes an obstacle to detection of the limit value. Therefore, a local pump circuit 44 is disposed to drive the gate of the transistor QN11 with a voltage higher than the boosted voltage VPP by the threshold voltage Vth. The local pump circuit 44 receives the activation signal ACTa to keep the transistor QN11 off during the verify operation.

As a result, the current passage of the voltage detection circuit 34 is shut off during the verify operation as similar to the above-described embodiment, so that the power consumption will be reduced. In addition to this, the switching transistor being formed as a high breakdown voltage one, there is no need of using a high breakdown voltage one in the differential amplifier 42.

Figure 10:
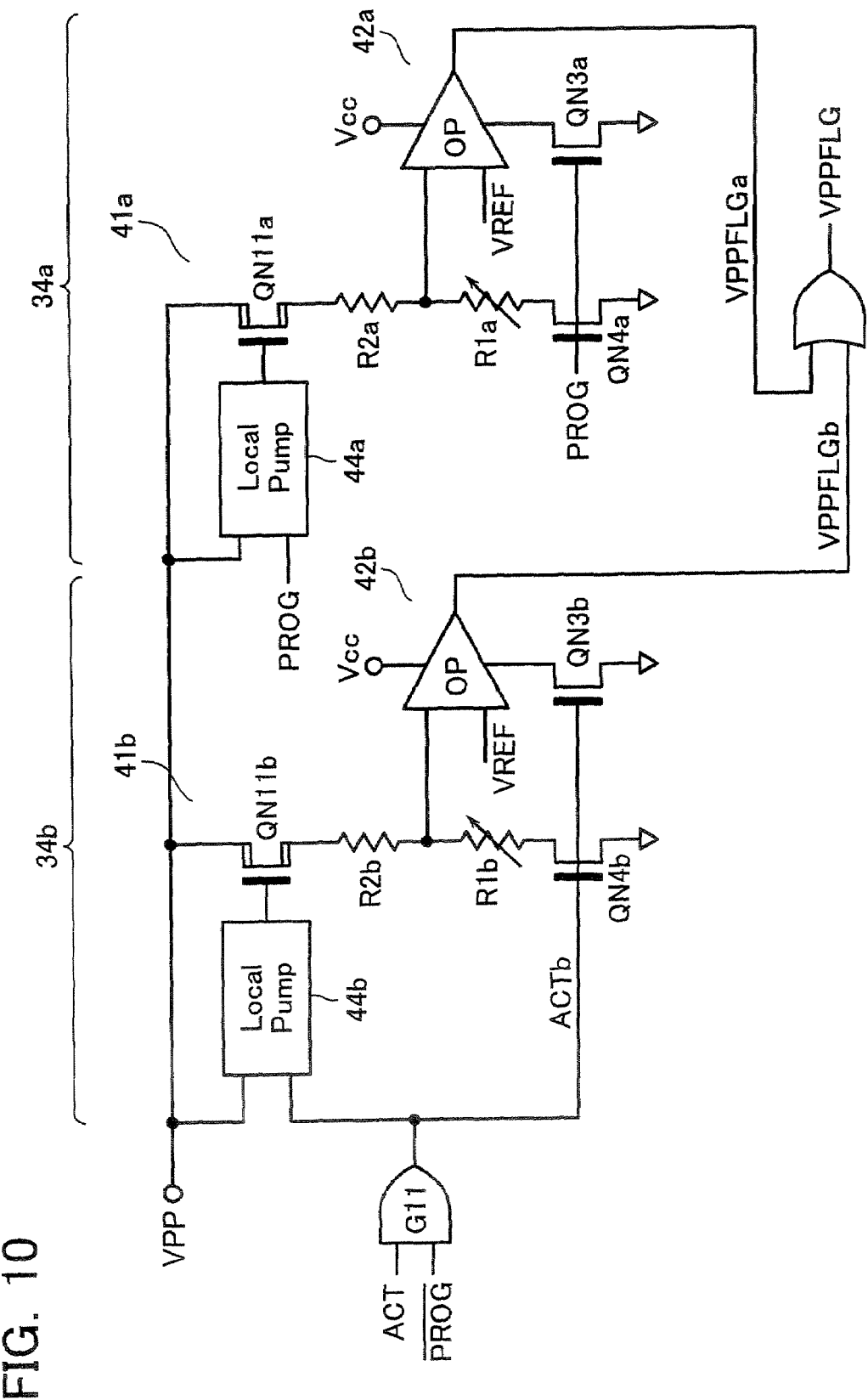
FIG. 10 shows still another voltage detecting circuit.

FIG. 10 shows still another configuration of the voltage detecting circuit 34, in which a normal limiter 34a and a high resistance limiter 34b are disposed in parallel. While these limiters 34a and 34b are basically the same as that shown in FIG. 9, resistors R1b, R2b in the resistive divider circuit 41b in the limiter 34b, which is activated at the write times, are set to be larger than resistors R1a, R2a in the resistive voltage divider circuit 41a in the limiter 34a, which is activated at the other times.

The normal limiter 34a is activated with a signal PROG, that becomes "H" at the write time. By contrast, the high resistive limiter 34b is activated at the other times except write voltage generating time under the control of a gate G11 that takes AND logic of the activation signal ACT and the signal /PROG. Therefore, An OR logic output of the detected outputs VPPFLGa and VPPFLGb of these limiters 34a and 34b becomes the final detection signal VPPFLG.

Figure 11:
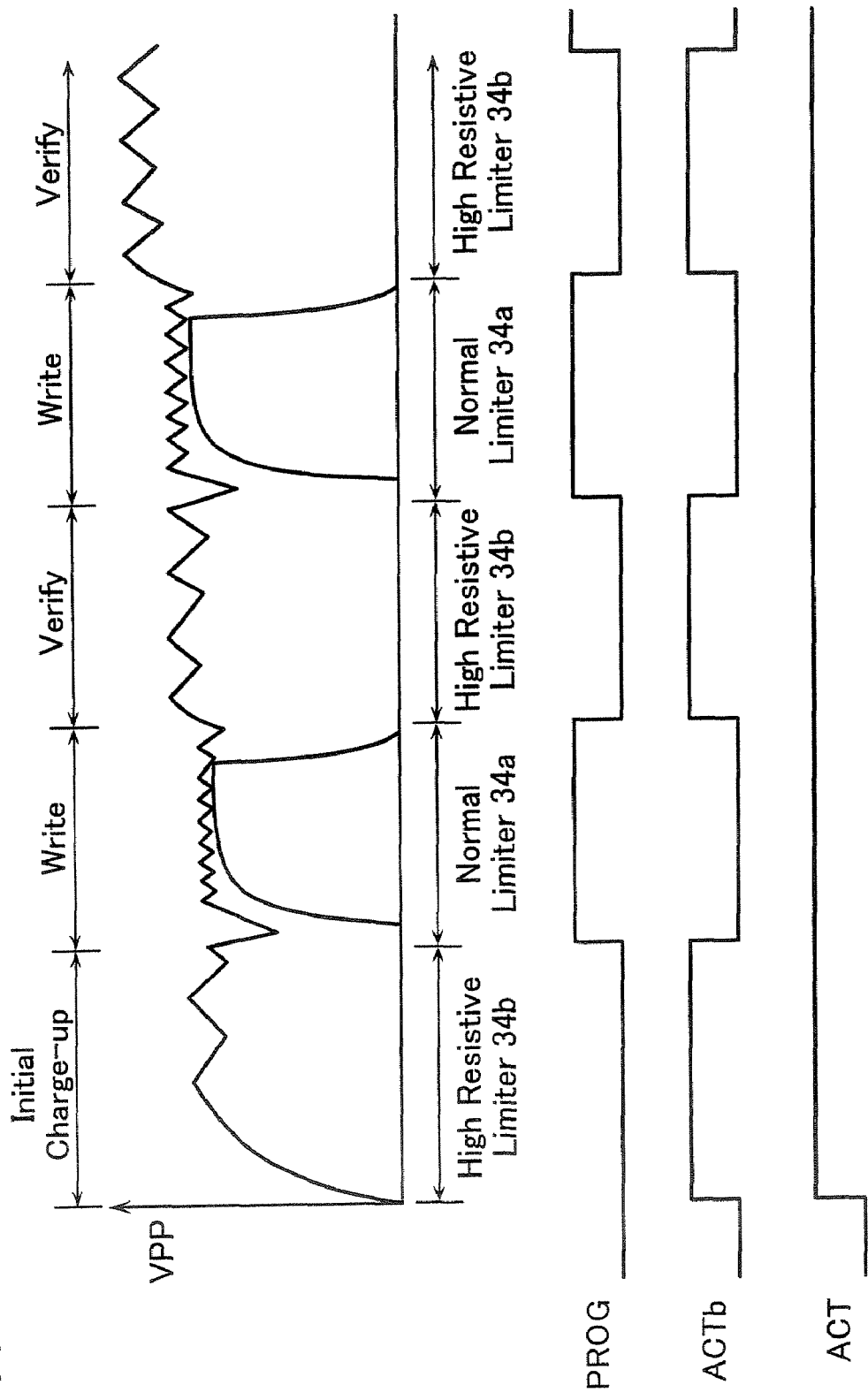
FIG. 11 shows write voltage waveforms in a case where the circuit shown in FIG. 10 is used.

FIG. 11 shows the write voltage waveforms obtained in the case where the above-described two systems of limiters 34a and 34b are used. The normal limiter 34a becomes active at the write voltage application times while the high resistive limiter 34b is active at the others. Therefore, the ripple of the boosted voltage VPP at the write operation times is less than that at other operation times.

In general, making the resistance of the resistive voltage divider circuit large for reducing the power consumption, there is generated such a trouble that the ripple of the boosted voltage VPP becomes large. Therefore, simply making the resistive voltage divider circuit in the voltage detection circuit highly resistive in FIG. 4 or FIG. 9, it leads to instability of the write voltage Vpgm.

By contrast, in the circuit shown in FIG. 10, the high resistance limiter 34b is activated except the write operation periods, in which there is no problem of the ripple, thereby reducing the power consumption. The normal limiter 34a being activated during the write operations, the ripple is suppressed and it may be generated a stabilized write voltage.

Figure 12:
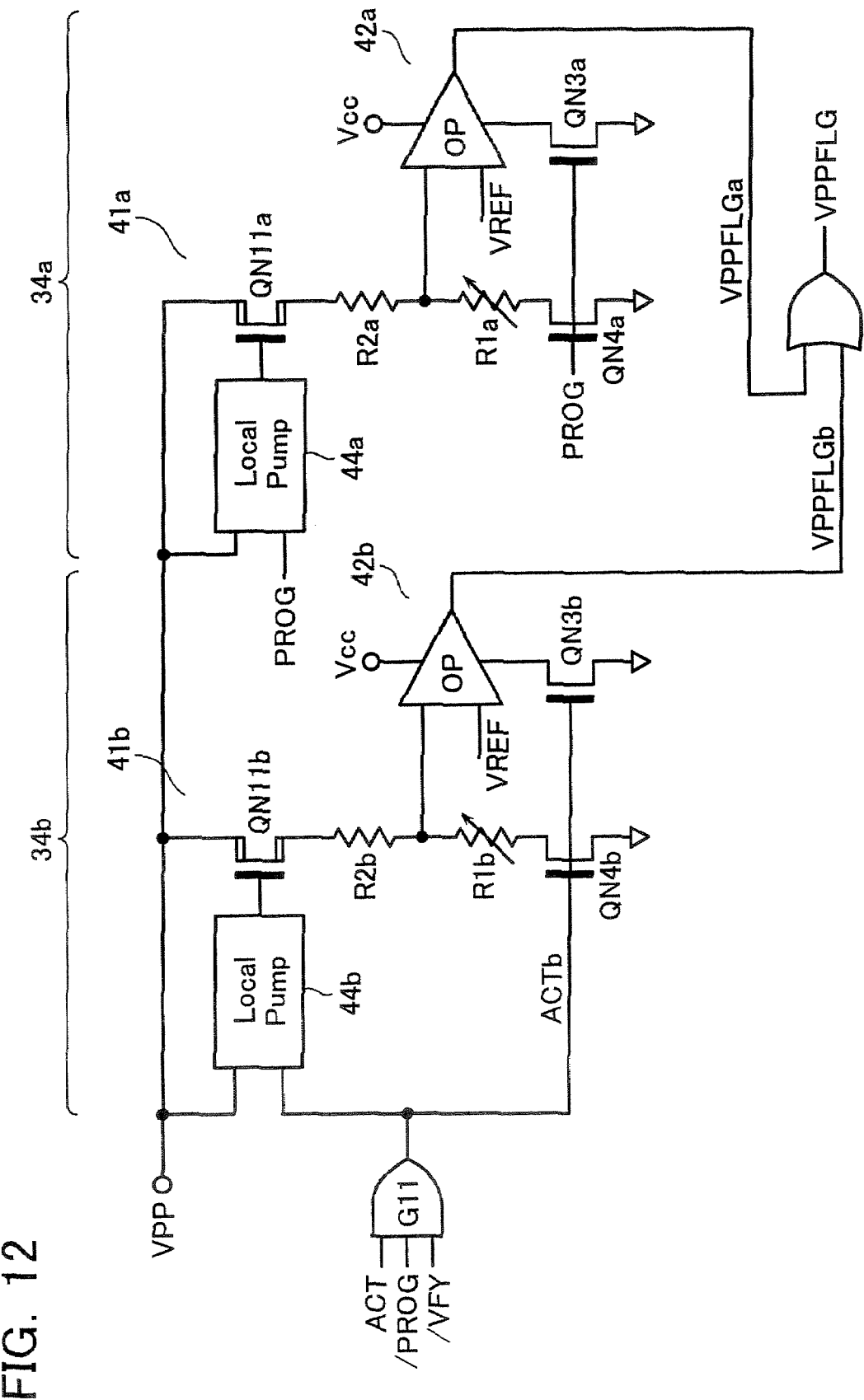
FIG. 12 shows still another voltage detecting circuit.

FIG. 12 shows another example, in which the circuit shown in FIG. 10 is modified. What is different from that shown in FIG. 10 is in that the AND gate G11 for controlling the high resistive limiter 34b has three input nodes for receiving the activation signal ACT, signal /PROG that becomes "L" at the write time, and signal /VFY that becomes "L" at the verify time. With this modification, the high resistive limiter 34b with a large ripple is controlled to be active only at the initial charge-up time in the write cycles.

Figure 13:
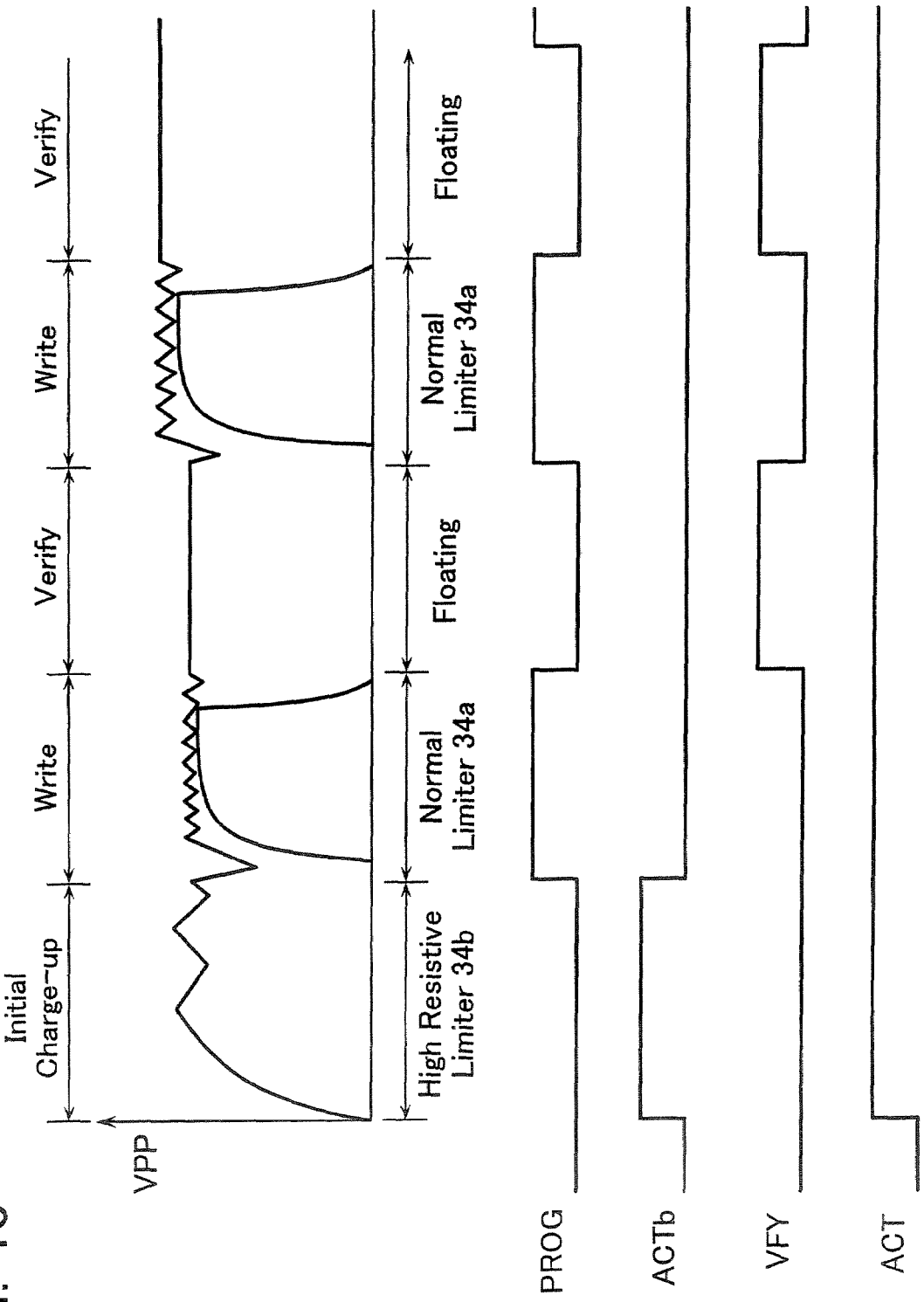
FIG. 13 shows write voltage waveforms in a case where the circuit shown in FIG. 12 is used.

FIG. 13 shows write voltage waveforms in a case with the circuit shown in FIG. 12. During the write operations, the normal limiter 34a is active like the circuit shown in FIG. 10. During the verify operations, both of the limiters 34a and 34b are inactive, so that the VPP node is kept floating. At the initial charge-up time, the high resistive limiter 34b becomes active.

As a result, the power consumption will be reduced more than that of the circuit shown in FIG. 10.

So far, especially taking notice of the write voltage (Vpgm) generator in the internal voltage generating circuit, improved circuits thereof have been explained. However, as described above, various internally boosted voltages are used in the NAND-type flash memory. The relationships in these internal voltage generators will be explained below.

Figures 14, 15:
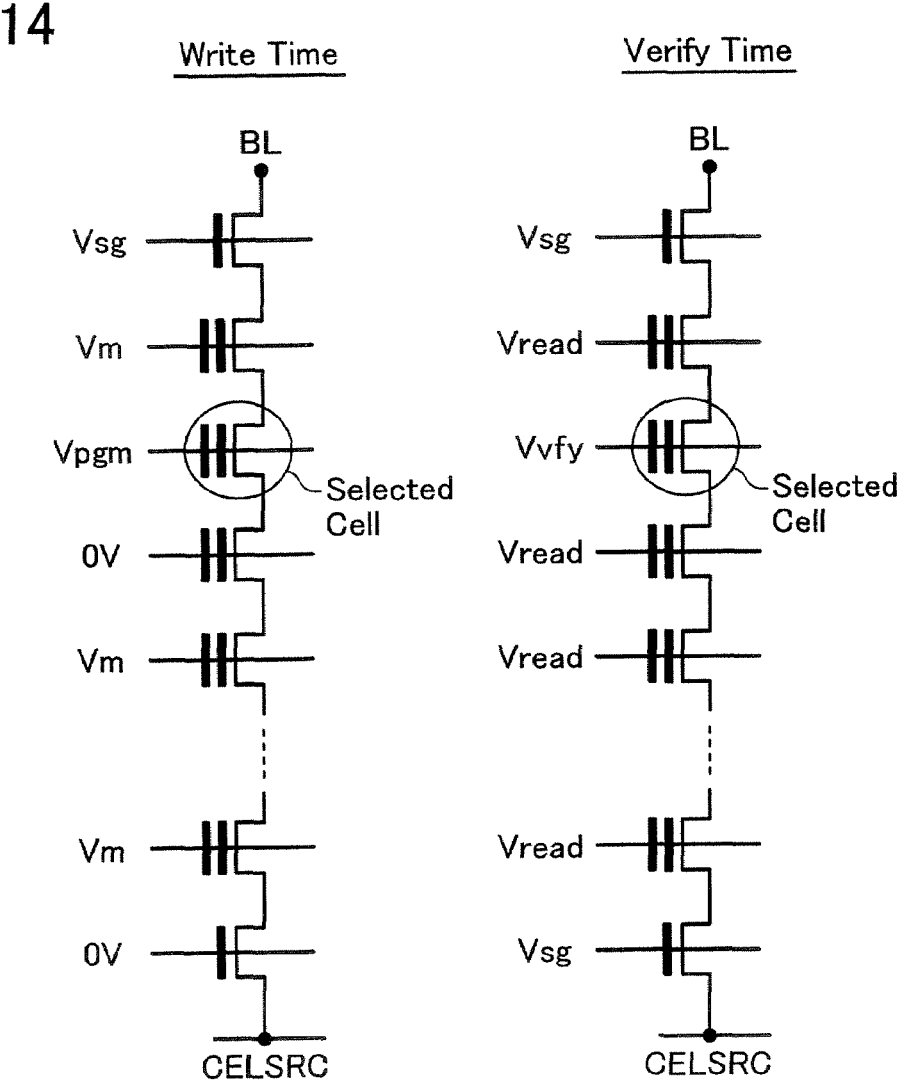
FIG. 14 shows bias voltages in the NAND cell unit at the write time and the verify time.
FIG. 15 shows voltages and operations of the voltage detecting circuit at the write time and the verify time.

FIG. 14 shows bias voltages in the NAND cell unit at the write time and the verify time. At the write time with a self-boost write scheme, a selected word line is applied with write voltage Vpgm; a non-selected word line disposed on the source line side to be adjacent to the selected word line is applied with 0V for channel-cutting; and the remaining non-selected word lines are applied with the write middle voltage Vm (<Vpgm) for channel-boosting. Bit line side select gate line is applied with Vsg, which turns on the select gate transistor.

At the verify time, the selected word line is applied with a verify voltage Vvfy corresponding to the lowest threshold value to be verified; non-selected word lines are applied with read pass voltage Vread; and the select gate lines are applied with Vsg, which turns on the select gate transistors.

As summarized in FIG. 15, the write middle voltage Vm is used only during the write operation like the write voltage Vpgm. Therefore, Vm generator is formed as being inactive during the verify operation like the Vpgm generator. By contrast, verify voltage Vvfy and read pass voltage Vread are ones used only at the verify time. Therefore, by contrast to the Vpgm generator, Vvfy generator and Vread generator may be formed as being inactive during the write operation.

Vsg applied to the select gate line is used during the whole period for transferring Vcc. Therefore, Vsg generator will be formed like the conventional one in such a manner that boost operation thereof is repeatedly made on and off with the voltage detecting circuit kept active during the whole read and write time.

Figure 16:
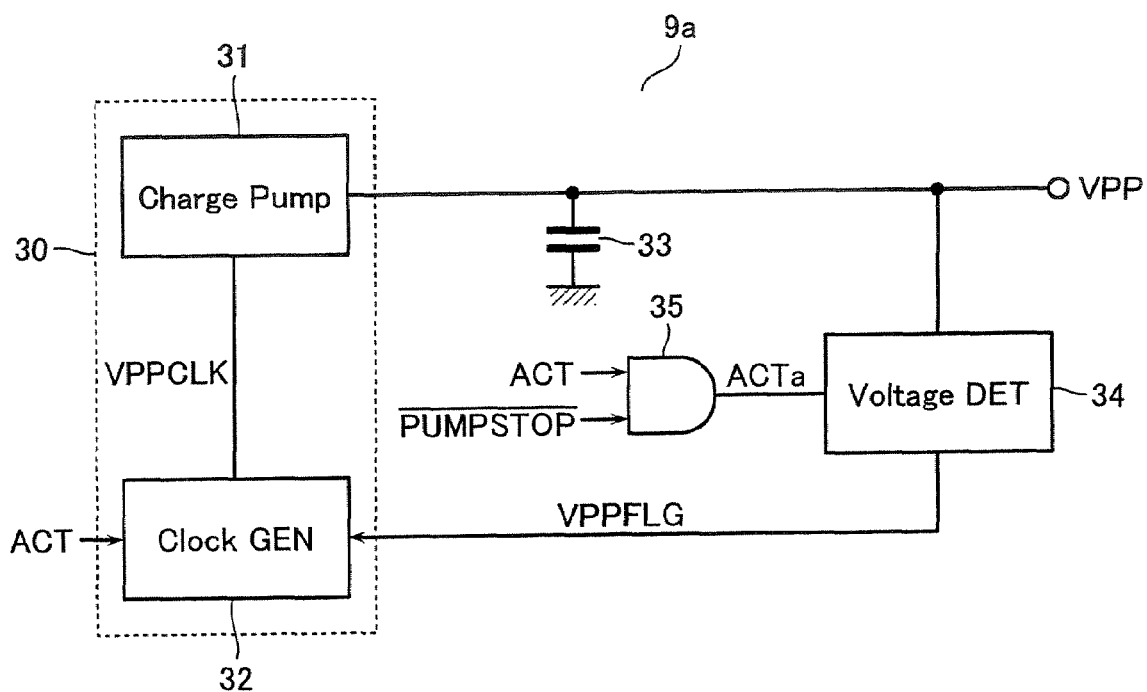
FIG. 16 shows another example of the Vpgm generating circuit.

FIG. 16 shows another example of Vpgm generating circuit 9a. What is different from the circuit shown in FIG. 3 is in that activation signal ACT and pump stop signal /PUMPSTOP are used as two inputs of AND gate 35. The pump stop signal /PUMPSTOP is, as shown in FIG. 17, such a signal that becomes "H" only when a word line is coupled to the VPP node as a load (this is a first load state, and write voltage Vpgm applying period) and the initial charging period, and "L" in the remaining second load states (i.e., no word lines are not coupled to the VPP node).

Figure 17:
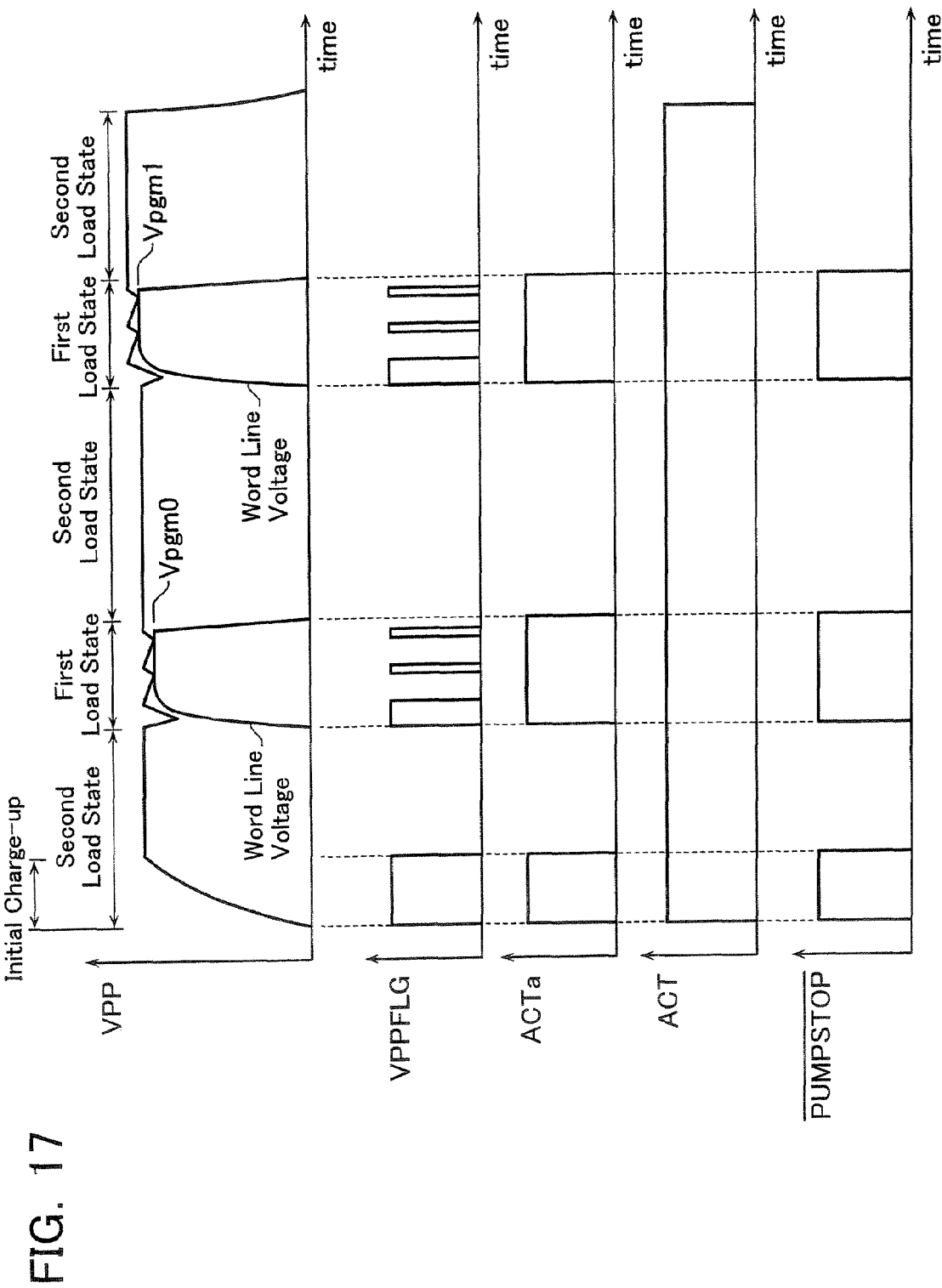
FIG. 17 shows operation waveforms of the voltage detecting circuit.

As a result, as shown in FIG. 17, while the word line is not coupled to the boost circuit 30 and except the initial charging-up period, the voltage detecting circuit 34 is made inactive, and current passage thereof is shut off. Therefore, the ripple of the boosted voltage is removed before the timing when the initial write voltage Vpgm0 is applied to the selected word line, and the consumption current will be reduced more effectively.

Note here that something loads are coupled to the output of the boost circuit even when the word line is not coupled to it. Therefore, there is a fear that the output voltage drops due to the junction leak of the load transistor and the like. If the boost circuit 30 is restarted in a state that the output voltage is lowered at the moment when the word line is coupled to it, the rising of the write voltage applied to the word line may be delayed.

Considering the above-described situation, it is preferable to make the rise timing of the pump stop signal /PUMPSTOP slightly precede the timing when the word line is coupled to the boost circuit.

Figure 18:
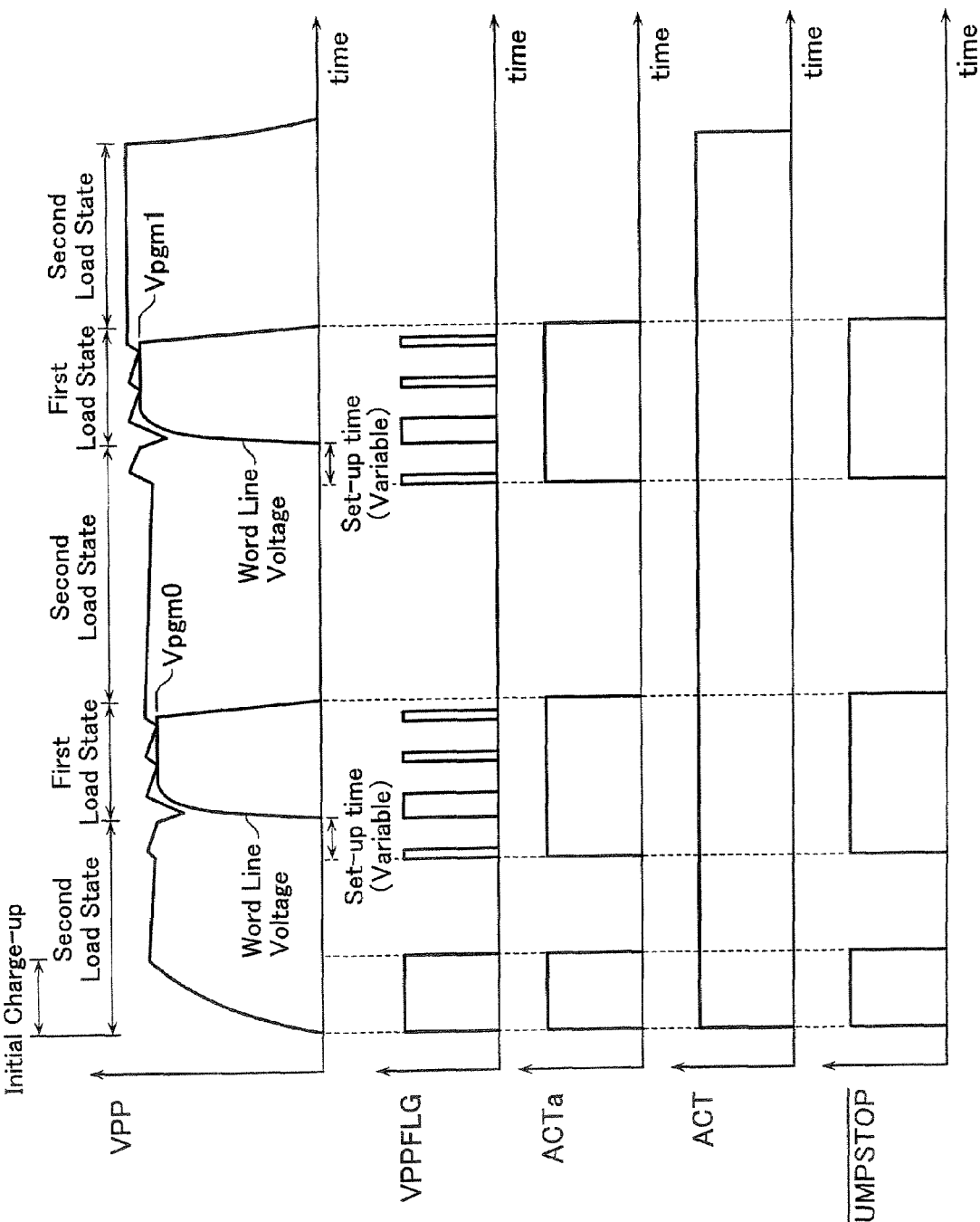
FIG. 18 shows other operation waveforms of the voltage detecting circuit.

FIG. 18 shows waveforms in correspondence with those shown in FIG. 17 in a case where the above-described timing control is performed in the circuit shown in FIG. 16. There is provided a set-up time between the rise timing of the pump stop signal /PUMPSTOP and that the word line is coupled to the boost circuit. As a result, the voltage detecting circuit 34 is activated previous to the timing when the word line is coupled to the boost circuit, and resulting in that it becomes possible to avoid the delay of word line rising. The set-up time being made variable, there will be provided a semiconductor memory with a high degree of freedom.

Figure 19:
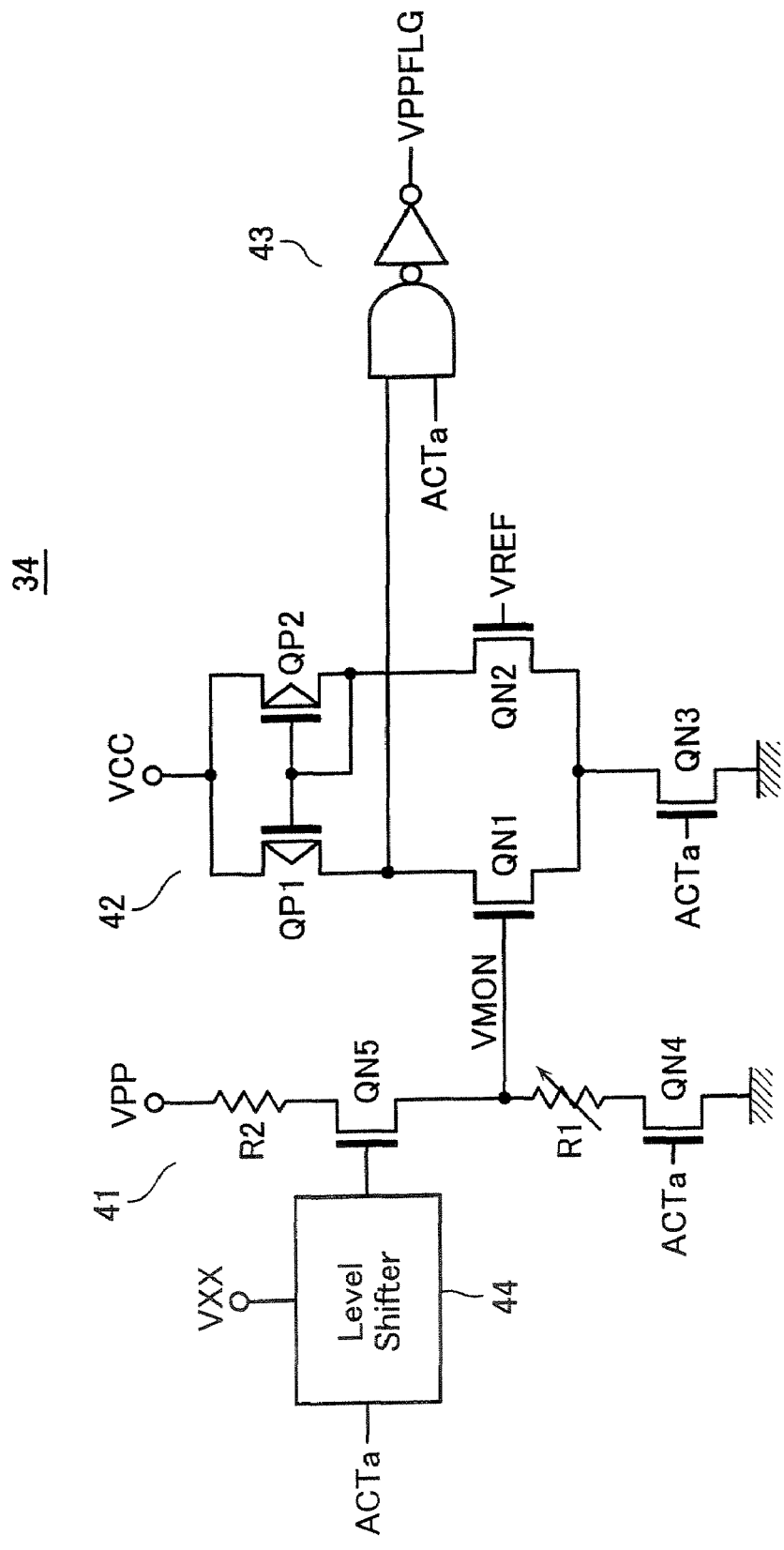
FIG. 19 shows another example of the voltage detecting circuit.

FIG. 19 shows another example of the voltage detecting circuit 34. As different from that shown in FIG. 9, there is provided a switching NMOS transistor QN5 between the resistor R2 disposed on the boost circuit side in the resistive divider circuit 41 and the input node of the differential amplifier 42, which is driven with the activation signal ACTa. This switching transistor QN5 is an enhancement (E) type of and a high breakdown voltage one with a gate insulating film thicker than others.

Although in case this switching transistor QN5 is used, the switching transistor QN4 disposed on the resistor R1 side may be removed, both transistors are used in the example shown in FIG. 19.

To make the on-state channel resistance of the transistor QN5 low, a level shifter 44 is disposed in addition to the transistor QN5 for level-shifting the activation signal ACTa to be higher than the power supply voltage Vcc and applying it to the gate of the transistor QN5.

In case a high breakdown voltage transistor is used as this switching transistor QN5, there is no need of using high breakdown ones for the transistors QN1, QN2 and QN4.

Figure 20:
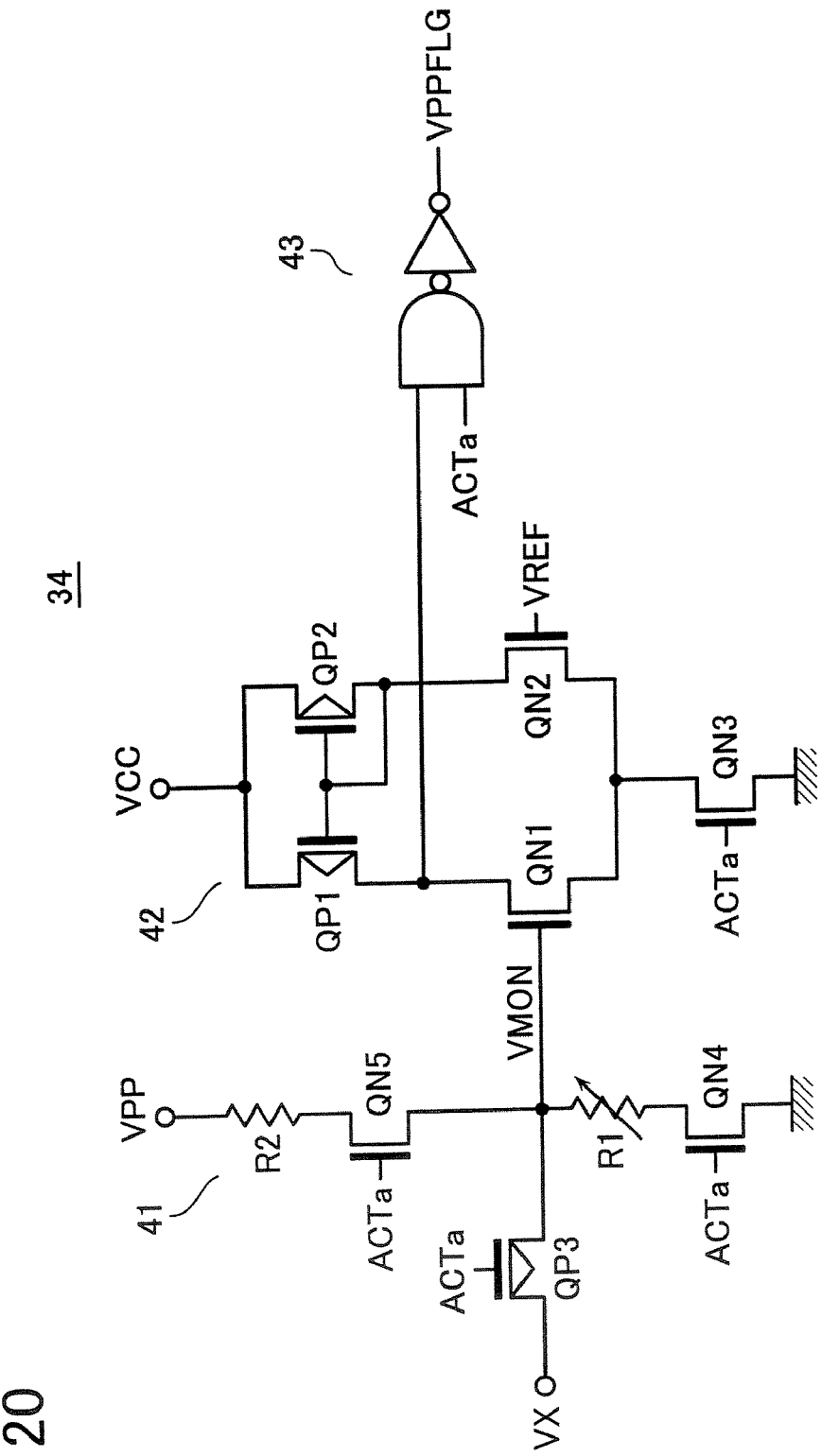
FIG. 20 shows still another example of the voltage detecting circuit.

FIG. 20 shows still another modification of that shown in FIG. 19. As the switching NMOS transistor QN5 disposed on the resistance R2 side, an intrinsic (I) type of NMOS transistor is used, the threshold voltage of which is lower than the normal E-type of NMOS transistor. Therefore, the gate of NMOS transistor QN5 is directly driven with the activation signal ACTa without the level shifter 44.

In a case, however, where the off-state leakage of the transistor QN5 is large, the boosted output VPP may be reduced in level. To avoid such a situation, a bias voltage VX is applied to the source of the transistor QN5 via a switching PMOS transistor QP3 when the transistor QN5 is in an off-state.

That is, when the transistor QN5 is off, the switching PMOS transistor QP3 is turned on with the activation signal ACTa applied to the gate, so that a back bias is applied to the source of the transistor QN5. As a result, the transistor QN5 will be certainly kept off. In the circuit shown in FIG. 20, as different from that shown in FIG. 19, it is necessary to use the switching transistor QN4 disposed on the resistor R1 side because it is in need of cutting off the current carried from the switching transistor QP3 to the Vss node.

Next, as an embodiment, an electric card using the non-volatile semiconductor memory devices according to the above-described embodiments of the present invention and an electric device using the card will be described bellow.

Figure 21:
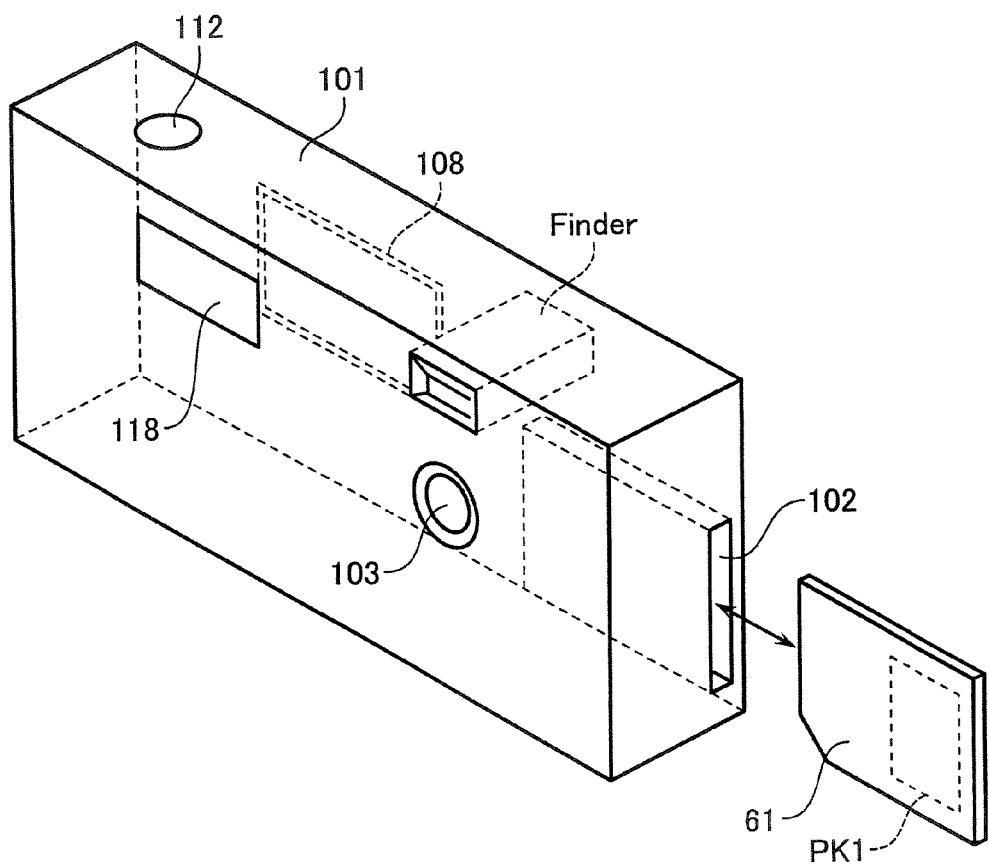
FIG. 21 shows another embodiment applied to a digital still camera.

FIG. 21 shows an electric card according to this embodiment and an arrangement of an electric device using this card. This electric device is a digital still camera 101 as an example of portable electric devices. The electric card is a memory card 61 used as a recording medium of the digital still camera 101. The memory card 61 incorporates an IC package PK1 in which the non-volatile semiconductor memory device or the memory system according to the above-described embodiments is integrated or encapsulated.

The case of the digital still camera 101 accommodates a card slot 102 and a circuit board (not shown) connected to this card slot 102. The memory card 61 is detachably inserted in the card slot 102 of the digital still camera 101. When inserted in the slot 102, the memory card 61 is electrically connected to electric circuits of the circuit board.

If this electric card is a non-contact type IC card, it is electrically connected to the electric circuits on the circuit board by radio signals when inserted in or approached to the card slot 102.

Figure 22:
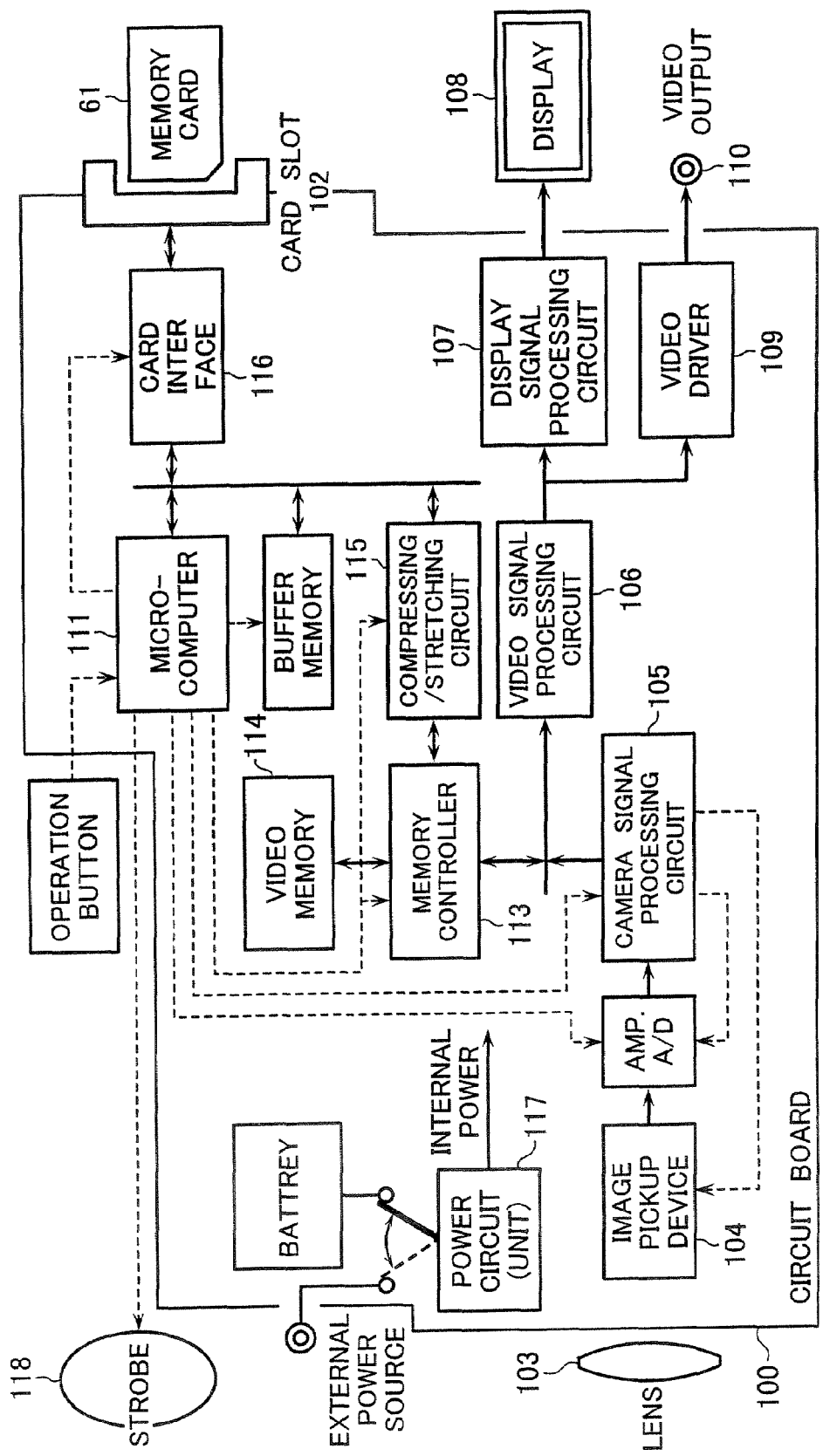
FIG. 22 shows the internal configuration of the digital still camera.
Figure 23A:
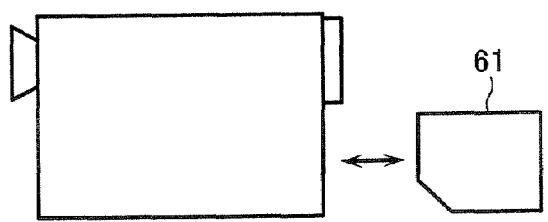
FIGS. 23A to 23J show other electric devices to which the embodiment is applied.
Figure 23F:
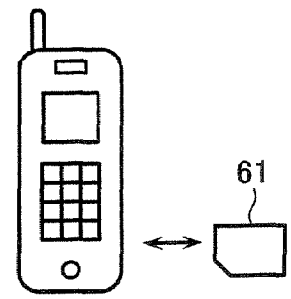
Figure 23B:
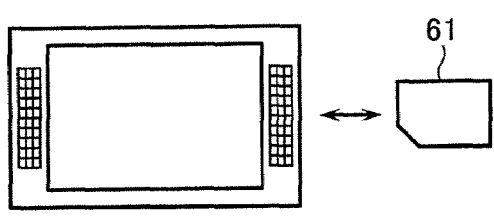
Figure 23G:
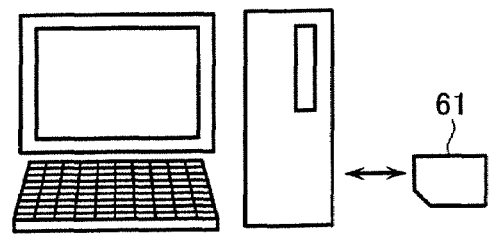
Figure 23C:
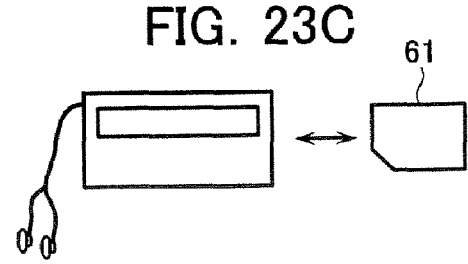
Figure 23H:
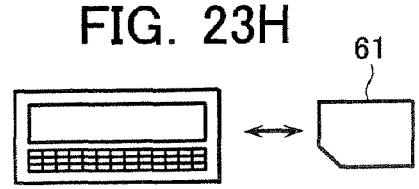
Figure 23D:
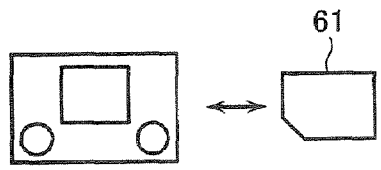
Figure 23I:
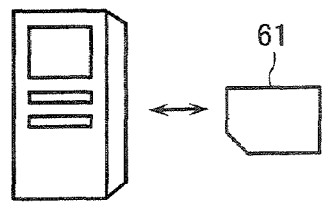
Figure 23E:
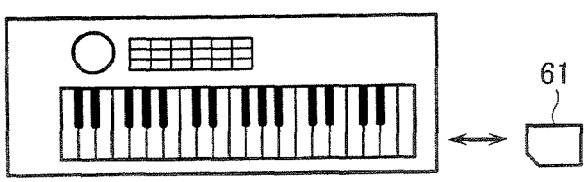
Figure 23J:
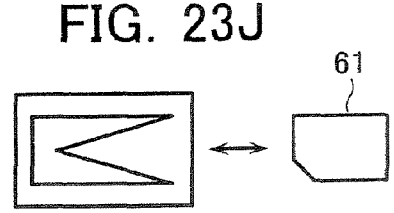

FIG. 22 shows a basic arrangement of the digital still camera. Light from an object is converged by a lens 103 and input to an image pickup device 104. The image pickup device 104 is, for example, a CMOS sensor and photoelectrically converts the input light to output, for example, an analog signal. This analog signal is amplified by an analog amplifier (AMP), and converted into a digital signal by an A/D converter (A/D). The converted signal is input to a camera signal processing circuit 105 where the signal is subjected to automatic exposure control (AE), automatic white balance control (AWB), color separation, and the like, and converted into a luminance signal and color difference signals.

To monitor the image, the output signal from the camera processing circuit 105 is input to a video signal processing circuit 106 and converted into a video signal. The system of the video signal is, e.g., NTSC (National Television System Committee). The video signal is input to a display 108 attached to the digital still camera 101 via a display signal processing circuit 107. The display 108 is, e.g., a liquid crystal monitor.

The video signal is supplied to a video output terminal 110 via a video driver 109. An image picked up by the digital still camera 101 can be output to an image apparatus such as a television set via the video output terminal 110. This allows the pickup image to be displayed on an image apparatus other than the display 108. A microcomputer 111 controls the image pickup device 104, analog amplifier (AMP), A/D converter (A/D), and camera signal processing circuit 105.

To capture an image, an operator presses an operation button such as a shutter button 112. In response to this, the microcomputer 111 controls a memory controller 113 to write the output signal from the camera signal processing circuit 105 into a video memory 114 as a flame image. The flame image written in the video memory 114 is compressed on the basis of a predetermined compression format by a compressing/stretching circuit 115. The compressed image is recorded, via a card interface 116, on the memory card 61 inserted in the card slot.

To reproduce a recorded image, an image recorded on the memory card 61 is read out via the card interface 116, stretched by the compressing/stretching circuit 115, and written into the video memory 114. The written image is input to the video signal processing circuit 106 and displayed on the display 108 or another image apparatus in the same manner as when image is monitored.

In this arrangement, mounted on the circuit board 100 are the card slot 102, image pickup device 104, analog amplifier (AMP), A/D converter (A/D), camera signal processing circuit 105, video signal processing circuit 106, display signal processing circuit 107, video driver 109, microcomputer 111, memory controller 113, video memory 114, compressing/stretching circuit 115, and card interface 116.

The card slot 102 need not be mounted on the circuit board 100, and can also be connected to the circuit board 100 by a connector cable or the like.

A power circuit 117 is also mounted on the circuit board 100. The power circuit 117 receives power from an external power source or battery and generates an internal power source voltage used inside the digital still camera 101. For example, a DC-DC converter can be used as the power circuit 117. The internal power source voltage is supplied to the respective circuits described above, and to a strobe 118 and the display 108.

As described above, the electric card according to this embodiment can be used in portable electric devices such as the digital still camera explained above. However, the electric card can also be used in various apparatus such as shown in FIGS. 23A to 23J, as well as in portable electric devices. That is, the electric card can also be used in a video camera shown in FIG. 23A, a television set shown in FIG. 23B, an audio apparatus shown in FIG. 23C, a game apparatus shown in FIG. 23D, an electric musical instrument shown in FIG. 23E, a cell phone shown in FIG. 23F, a personal computer shown in FIG. 23G, a personal digital assistant (PDA) shown in FIG. 23H, a voice recorder shown in FIG. 23I, and a PC card shown in FIG. 23J.

While the NAND-type flash memory has been explained in the above-described embodiments, the present invention may be adapted to other semiconductor memories such as NOR-type, DINOR-type, AND-type and so on. Further, the present invention is not limited to the semiconductor memories, but may be adapted to other semiconductor integrated circuit devices with the same boost circuit as described above.

Still further, it will be understood by those skilled in the art that various changes in form and detail may be made without departing from the spirit, scope, and teaching of the invention.

What is claimed is:

1. A semiconductor integrated circuit device comprising:
   a boost circuit configured to boost power supply voltage so as to generate a boosted voltage;
   a voltage detecting circuit configured to detect the boosted voltage of the boost circuit and control ON/OFF of the boost circuit; and
   a gate circuit configured to set the voltage detecting circuit to be in such an inactive state that current passage thereof is shut off, or to be in such an active state that current passage thereof is conductive, wherein
   the gate circuit generates a first activation signal for activating the voltage detecting circuit, and sets the voltage detecting circuit to be in the inactive state while a load is separated from an output node of the boost circuit, wherein
   the voltage detecting circuit comprises a first activation transistor disposed between the output node of the boost circuit and ground potential node on the current passage, and wherein
   the first activation transistor is turned on by the first activation signal provided to a gate thereof.

2. The semiconductor integrated circuit device according to claim 1, wherein
   the gate circuit comprises a first logic gate, which generates the first activation signal based on a logic of a second activation signal for activating the boost circuit and a connection state signal designating the connection state of the load.

3. The semiconductor integrated circuit device according to claim 1, wherein
   the voltage detecting circuit comprises first and second limiters disposed in parallel with each other to be selectively activated in accordance with operation periods, the first and second limiters including current passages with different resistances from each other.

4. The semiconductor integrated circuit device according to claim 1, wherein
   the load is a word line in a memory cell array, and the boost circuit is a write voltage generating circuit for supplying a write voltage to the word line.

5. The semiconductor integrated circuit device according to claim 1, wherein
   the gate circuit activates the voltage detecting circuit previous to the timing when the load is coupled to the boost circuit.

6. The semiconductor integrated circuit device according to claim 1, wherein
   the voltage detecting circuit comprises:
   a resistive voltage divider having the first activation transistor;
   a differential amplifier having a pair of differential transistors with two input nodes, to which the divided output voltage of the voltage divider circuit and a reference voltage are input, and a second activation transistor disposed between the common source of the pair of the differential transistors and the ground potential node or power supply node; and
   a second logic gate for controlling ON/OFF of the boost circuit based on a logic of the output of the differential amplifier and the first activation signal.

7. The semiconductor integrated circuit device according to claim 6, further comprising:
   a switching transistor disposed on the edge adjacent to the output node of the boost circuit in the resistive divider circuit.

8. The semiconductor integrated circuit device according to claim 6, further comprising:
   a switching transistor disposed between a resistor on the output node side of the boost circuit in the resistive voltage divider circuit and one of the input nodes of the differential amplifier to be activated with the first activation signal; and
   a level shifter connected to the gate of the switching transistor for on-driving it with a boosted voltage.

9. The semiconductor integrated circuit device according to claim 6, further comprising:
   a first switching transistor disposed between a resistor on the output node side of the boost circuit in the resistive voltage divider circuit and one of the input nodes of the differential amplifier to be activated with the first activation signal; and
   a second switching transistor disposed for applying a back bias to the source of the first switching transistor when it is in an off-state.

10. A semiconductor integrated circuit device comprising:
    a memory cell array with electrically rewritable and non-volatile memory cells arranged therein;
    a read/write circuit configured to read data of and write data in the memory cell array; and
    an internal voltage generating circuit configured to generate internal voltages supplied to the memory cell array and the read/write circuit in accordance with operation modes, wherein
    the internal voltage generating circuit comprises:
    a boost circuit configured to boost power supply voltage so as to generate a boosted voltage;
    a voltage detecting circuit configured to detect the boosted voltage of the boost circuit and control ON/OFF of the boost circuit; and
    a gate circuit configured to set the voltage detecting circuit to be in such an inactive state that current passage thereof is shut off, or to be in such an active state that current passage thereof is conductive, wherein
    the gate circuit generates a first activation signal for activating the voltage detecting circuit, and sets the voltage detecting circuit to be in the inactive state while a load is separated from an output node of the boost circuit, wherein
    the voltage detecting circuit comprises a first activation transistor disposed between the output node of the boost circuit and ground potential node on the current passage, and wherein
    the first activation transistor is turned on by the first activation signal provided to a gate thereof.

11. The semiconductor integrated circuit device according to claim 10, wherein
    the gate circuit comprises a first logic gate, which generates the first activation signal based on a logic of a second activation signal for activating the boost circuit and a connection state signal designating the connection state of the load.

12. The semiconductor integrated circuit device according to claim 10, wherein
the voltage detecting circuit comprises first and second limiters disposed in parallel with each other to be selectively activated in accordance with operation periods, the first and second limiters including current passages with different resistances from each other.

13. The semiconductor integrated circuit device according to claim 10, wherein
a transistor exposed to the output voltage of the boost circuit has a gate insulating film thicker than those of other transistors.

14. The semiconductor integrated circuit device according to claim 10, wherein
the load is a word line in the memory cell array, and the boost circuit is a write voltage generating circuit for supplying a write voltage to the word line.

15. The semiconductor integrated circuit device according to claim 10, wherein
the gate circuit activates the voltage detecting circuit previous to the timing when the load is coupled to the boost circuit.

16. The semiconductor integrated circuit device according to claim 10, wherein
the voltage detecting circuit comprises:
a resistive voltage divider having the first activation transistor;
a differential amplifier having a pair of differential transistors with two input nodes, to which the divided output voltage of the voltage divider circuit and a reference voltage are input, and a second activation transistor disposed between the common source of the pair of the differential transistors and the ground potential node or power supply node; and
a second logic gate for controlling ON/OFF of the boost circuit based on a logic of the output of the differential amplifier and the first activation signal.

17. The semiconductor integrated circuit device according to claim 10, wherein
the gate circuit is configured to set the voltage detecting circuit to be in the inactive state for verifying operations.

18. The semiconductor integrated circuit device according to claim 16, further comprising:
a switching transistor disposed on the edge adjacent to the output node of the boost circuit in the resistive divider circuit.

19. The semiconductor integrated circuit device according to claim 16, further comprising:
a switching transistor disposed between a resistor on the output node side of the boost circuit in the resistive voltage divider circuit and one of the input nodes of the differential amplifier to be activated with the first activation signal; and
a level shifter connected to the gate of the switching transistor for on-driving it with a boosted voltage.

20. The semiconductor integrated circuit device according to claim 16, further comprising:
a first switching transistor disposed between the resistor on the output node side of the boost circuit in the resistive voltage divider circuit and the input node of the differential amplifier to be activated with the first activation signal; and
a second switching transistor disposed for applying a back bias to the source of the first switching transistor when it is in an off-state.

* * * * *